Figure 1:
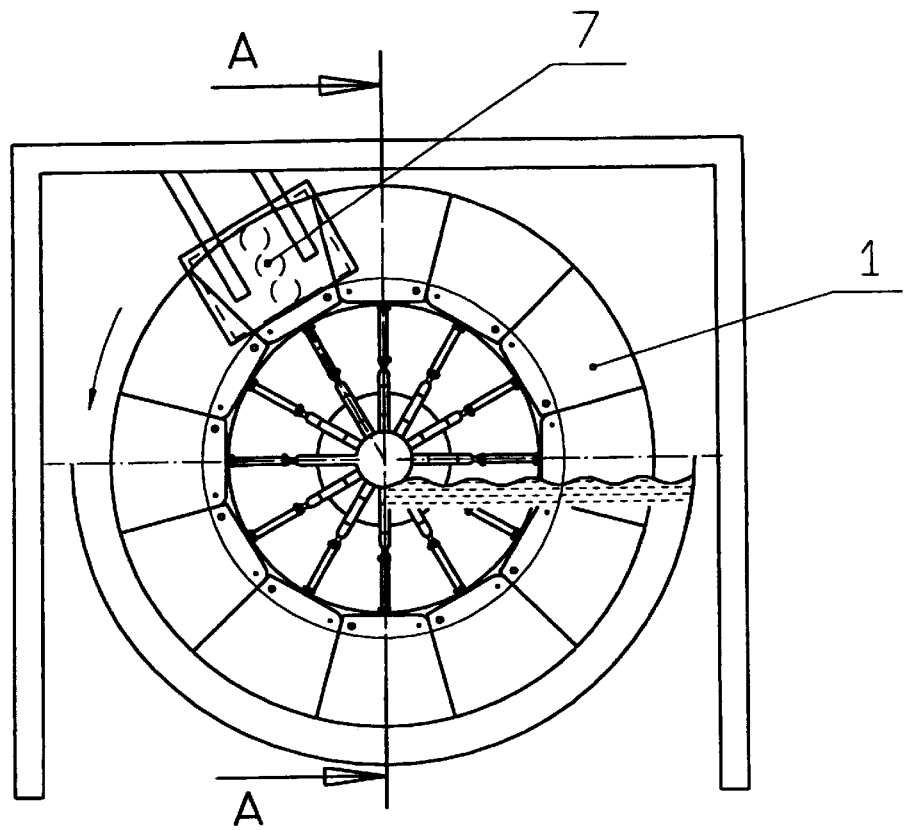

United States Patent [19]
Ekberg et al.

[11] Patent Number: 6,079,120
[45] Date of Patent: Jun. 27, 2000

[54] METHOD FOR MAKING DRYING MORE EFFECTIVE

[75] Inventors: Bjarne Ekberg, Turku; Göran Norrgård, Pargas, both of Finland; Juan A. Gallego Juárez, Madrid, Spain; Germán Rodriguez Corral, Madrid, Spain; Luis Elvira Segura, Madrid, Spain

[73] Assignee: Outokumpu Oyj, Finland

[21] Appl. No.: 09/325,916

[22] Filed: Jun. 4, 1999

[30]    Foreign Application Priority Data

Jun. 5, 1998 [FI] Finland ..................................... 981292

[51] Int. Cl.⁷ ...................................................... F26B 5/14
[52] U.S. Cl. ............................... 34/401; 210/384; 34/255; 34/164; 34/252
[58] Field of Search ............................... 34/255, 251, 252, 34/257, 258, 181, 187, 397, 401, 164; 210/324, 393, 384

[56] References Cited

U.S. PATENT DOCUMENTS

| | | | |
|---|---|---|---|
| 4,946,602 | 8/1990 | Ekberg et al. ........................... | 210/785 |
| 5,039,347 | 8/1991 | Hindstrom et al. ........................ | 134/1 |
| 5,151,186 | 9/1992 | Yoo et al. ................................ | 210/541 |
| 5,178,777 | 1/1993 | Ekberg et al. ........................... | 210/798 |
| 5,545,338 | 8/1996 | Ginn et al. .............................. | 210/791 |
| 5,615,494 | 4/1997 | Ekberg ...................................... | 34/585 |

*Primary Examiner*—Denise L. Ferensic
*Assistant Examiner*—Michelle A. Mattera
*Attorney, Agent, or Firm*—Morgan & Finnegan, L.L.P.

[57] ABSTRACT

The invention relates to a method for making the drying finely divided materials, more effective in a suction drier provided with a fine porous suction surface, where the radii of the fine pores of the suction surface are essentially within the range of 0.5–2 micrometers, and in which method, of a slurry containing liquid and solids there is made a filter cake (2,12,22) onto a fine porous liquid suction surface constituting the filter surface of the filter medium (1,11,21), According to the invention, the filter cake (2,12,22) and an oscillator (6,15,25) are arranged, in relation to each other, so that in between the filter cake (2,12,22) and the oscillator (6,15,25), there is generated an acoustic field by virtue of a mechanical contact between the filter cake (2,12,22) and the oscillator (6,15,25) or a structural element (7,16,26) connected to the oscillator.

8 Claims, 3 Drawing Sheets

METHOD FOR MAKING DRYING MORE EFFECTIVE

The present invention relates to a method for making the drying of materials filtered in a suction drier, particularly with finely divided materials, more effective by subjecting the filter cake made of said materials under the influence of an acoustic field.

From the FI patent 61,739, there is known a drying method and apparatus for drying web-like, pulverous, solid or porous material, in which method the material to be dried is put, by intermediation of a fine porous liquid-saturated suction surface, to hydraulic contact with a liquid maintained at underpressure in relation to the material to be dried. The apparatus used in said method comprises a fine porous liquid suction surface, where the radii of the fine pores are mainly within the range 0.5–2 micrometers.

The fine porous liquid suction surface constitutes the filter surface of the suction drier filter medium, which filter surface is put into contact with the material to be dried, such as slurry. While the filter surface is for instance plane-like, and by creating underpressure on the opposite side with respect to the filter surface of the filter medium, on the filter surface there is formed, owing to the influence of the suction, a cake filtered of the material to be dried, which cake is then scraped off the filter surface.

A restrictive factor in the filtering of finely divided materials, such as fine sulfide concentrates, titanium pigments, kaoline or calcite, is the high flow resistance of the filter cake as well as its large inner area, which binds large amounts of liquid to be filtered. Naturally the residual moisture is also affected by capillaries formed by tiny particles and their capillary forces. Thus the filtering capacity remains low, and the residual moisture in the filter cake remains high.

The residual moisture of the filter cake is bound to the cake material by different mechanisms. Part of the liquid to be filtered is adsorbed on the surface of the particles as a thin layer. The removal of this liquid is not possible without thermal energy. Part of the liquid is bound in the capillary networks formed by the particles. Depending on the surface chemistry of said particles and on the diameter of the capillary, with a given pressure difference, there is left a given amount of liquid. By increasing the pressure difference, liquid can be removed through smaller and smaller pores, which reduces the residual moisture. Moreover, part of the liquid is bound in extremely narrow capillaries and particle contact points, as well as in closed pores.

In the WO application 96/35,340, there is described a method for drying foodstuffs and other materials, said method applying a combination of hot air and ultrasonic oscillation. The products to be dried are transported through a closed chamber, so that inside the chamber, the products are subjected to the influence of hot air. In the chamber, ultrasonic waves are conducted to the products by means of flat ultrasonic oscillators, which are in direct contact with the products to be dried. The method described in said WO application 96/35340 is designed for materials, such as vegetables, that are dried as whole items. In that case the specific area to be dried is very small in comparison with finely divided materials.

The object of the present invention is to eliminate some of the drawbacks of the prior art and to achieve a new, more effective method for drying materials filtered in a suction drier, particularly finely divided materials with a particle size smaller than 100 micrometers, so that the filter cake made of said material is subjected under the influence of an acoustic field in order to reduce the residual moisture of the filter cake. The essential novel features of the invention are apparent from the appended claims.

In the method according to the invention, of the finely divided solids present in the slurry, there is first produced a filter cake onto the fine porous suction surface of the suction drier. According to the invention, the produced filter cake can be further dried by means of oscillation generated by an acoustic field, wherefore the filter cake and the oscillator are further arranged, with respect to each other, in a position where a mechanical contact is achieved between the filter cake and the oscillator used for boosting the drying process, or a structural element made to oscillate by means of said oscillator. The mechanical contact between the oscillator or the structural element made to oscillate by means of said oscillator and the filter cake creates an acoustic coupling. By virtue of said acoustic coupling, the residual moisture still left in said filter cake can be reduced, and thus the filtering result further improved, because the acoustic field created by said acoustic coupling causes oscillation in the filter cake, and consequently removes water, which is otherwise difficult to be removed.

In the method according to the invention, the surface of the oscillator or of the structural element made to oscillate by means of said oscillator that mechanically touches the filter cake is set, with respect to the filter cake, in a position where the filter cake, essentially throughout the whole surface opposite to the fine porous liquid suction surface is in mechanical contact with the surface of the oscillator or of the structural element made to oscillate. Most advantageously the mechanical contact is achieved so that the filter cake is made to move past the permanently installed oscillator or the structural element made to oscillate by means of said oscillator, in which case the surface of the filter cake opposite to the fine porous liquid suction surface makes, at least from time to time, a mechanical contact in order to create an acoustic field.

A mechanical contact, and hence an acoustic field, in between the oscillator or the structural element made to oscillate and the filter cake can also be achieved so that the oscillator or the structural element made to oscillate is moved with respect to the filter cake. The moving of the oscillator or the structural element made to oscillate with respect to the filter cake is carried out for instance so, that the oscillator or the structural element made to oscillate is transferred towards the surface opposite to the fine porous liquid suction surface of the filter cake, and the motion of the oscillator or the structural element made to oscillate is stopped, when a mechanical contact is made. Now the acoustic field can be essentially simultaneously focused to substantially the whole filter cake. The moving of the oscillator or the structural element made to oscillate with respect to the filter cake can also be carried out so that the oscillator or the structural element made to oscillate is moved past the permanently installed surface opposite to the fine porous liquid suction surface of the filter cake, so that there is achieved a mechanical contact between the filter surface and the oscillator or the structural element made to oscillate in order to create an acoustic field.

While applying the method according to the invention to a suction drier provided with a fine porous suction surface, where the radii of the fine pores of the suction surface are mainly within the range of 0.5–2 micrometers, the residual moisture extracted from the filter cake owing to the filter cake oscillation caused by the acoustic field is made to be removed through the fine porous liquid suction surface constituting the filter surface of the filter medium, when the pressure difference applied in the filtering process is maintained between the filter surface and the filter medium surface opposite to said filter surface.

The oscillation frequency applied in the method according to the invention is advantageously within the range of 20–60 kHz. Lower frequencies can also be applied, but these lower frequencies may lead to environmental hazards because of the extremely high noise level caused by the low frequency. The amplitude used in connection with the oscillation frequency is inversely proportional to the oscillation frequency, so that with a higher frequency, a lower amplitude is applied.

Advantageously the oscillator employed in the method according to the invention is an ultrasonic oscillator, for instance. In order to generate oscillation, there can also be used a piezoelectric or a magnetostrictive material, either as the oscillator itself, or in the structural element connected to said oscillator.

The materials that are suitable to be used in the method according to the invention advantageously have a particle size within the range of 0.5–10 micrometers. Such materials are for example sulfidic concentrates of copper and zinc, titanium pigments, kaoline, calcite and organic compounds, such as starch. However, depending on the structure of the material, the particle size range advantageous for the application of the method can be remarkably larger. In that case the particle size range may be 0.01–100 micrometers.

Figure 2:
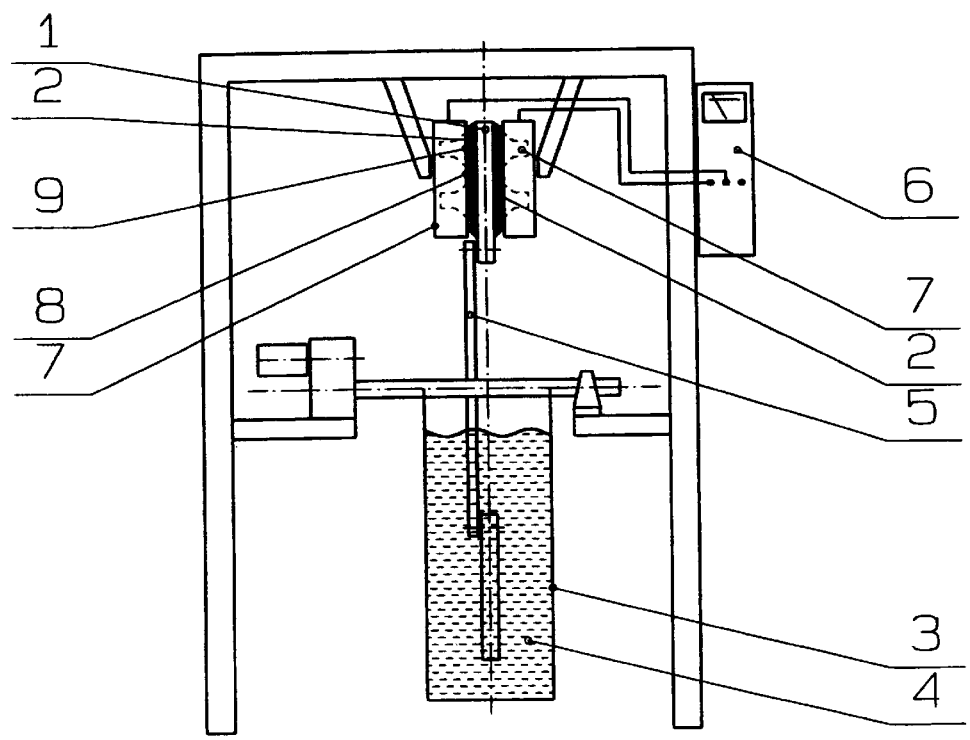
Figure 3:
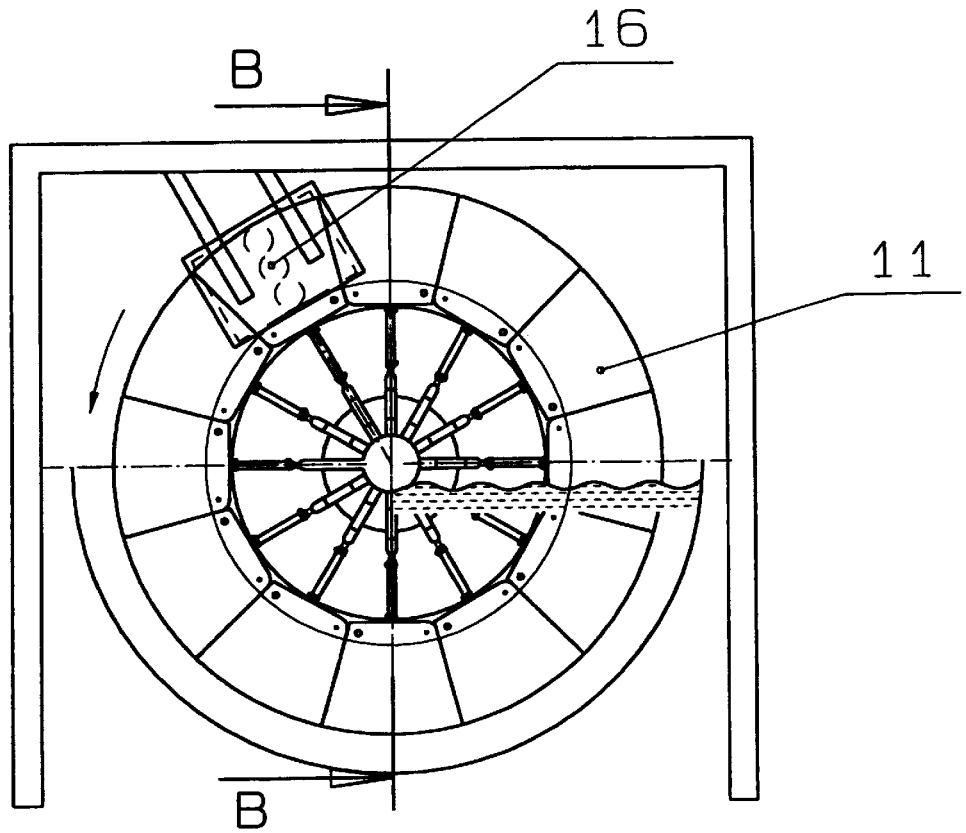
Figure 4:
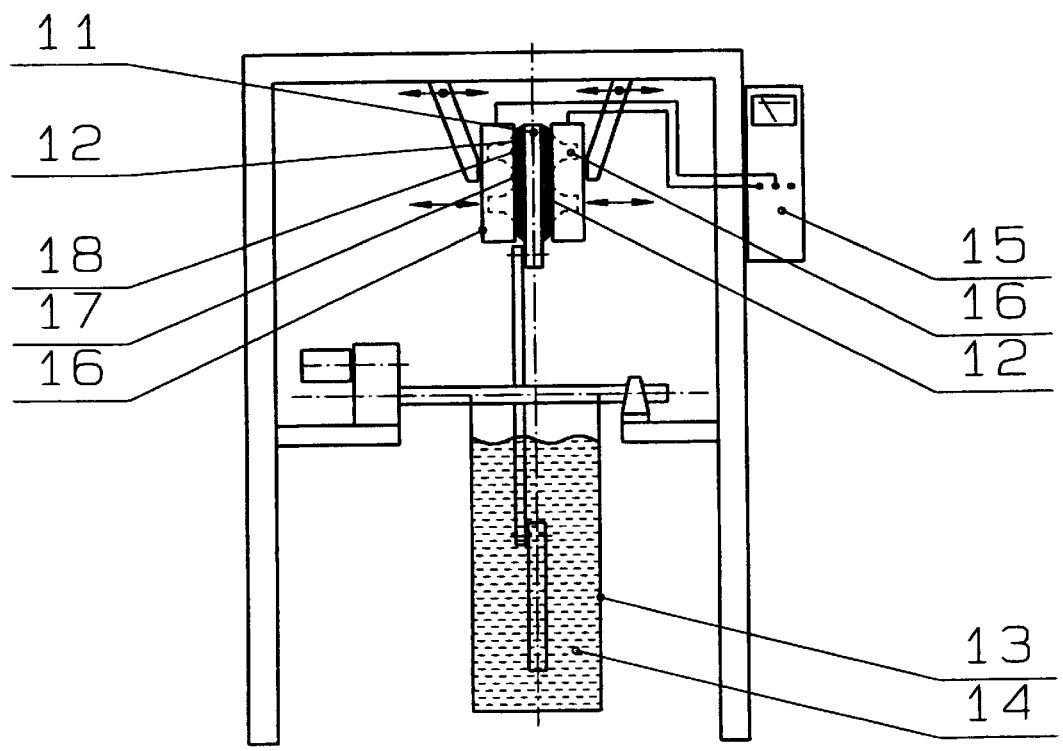
Figure 5:
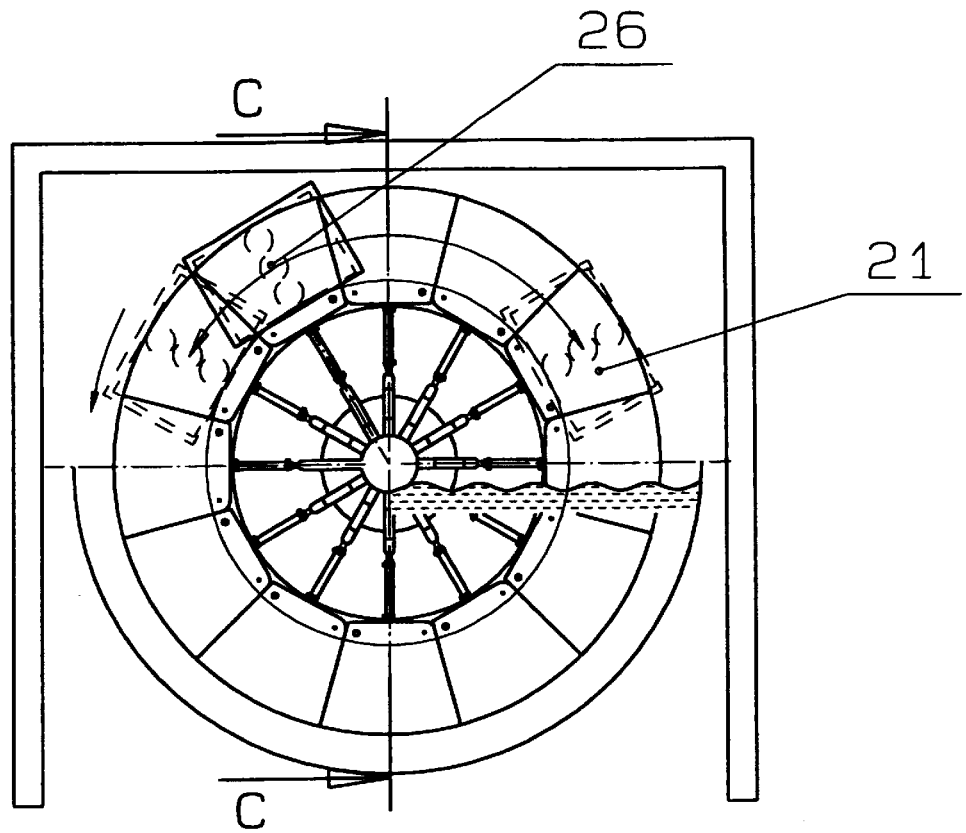
Figure 6:
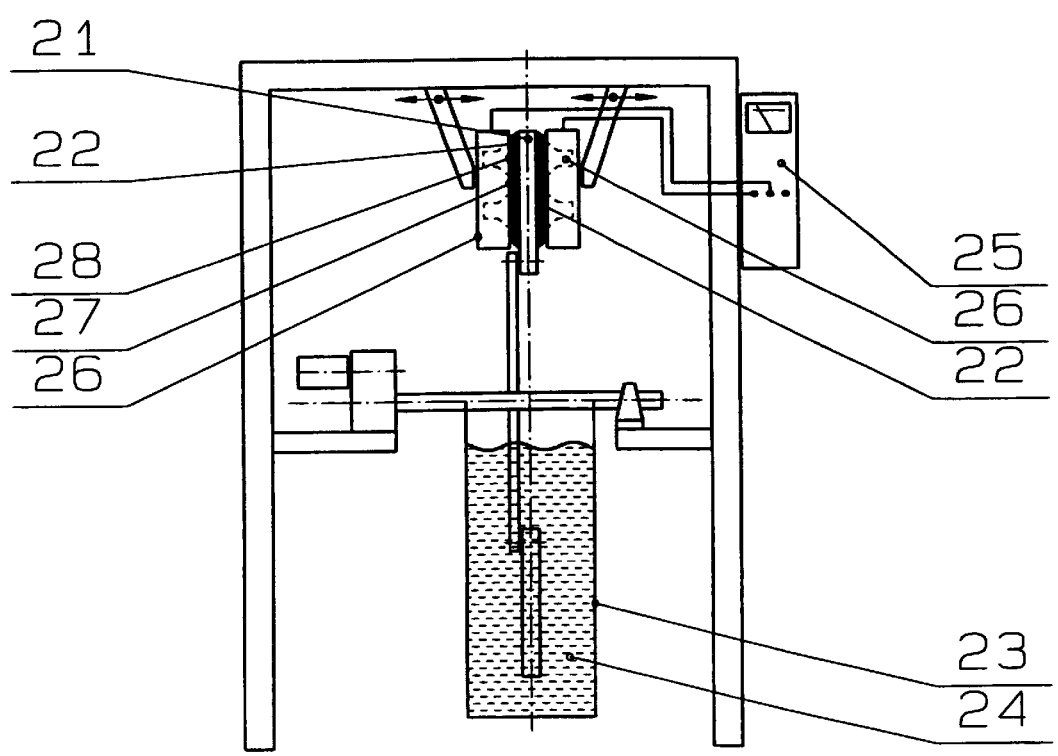

The invention is described in more detail below, with reference to the appended drawings, where FIG. 1 is a side-view illustration of a preferred embodiment of the invention, FIG. 2 illustrates the preferred embodiment of FIG. 1, seen in the direction A—A, FIG. 3 is a side-view illustration of another preferred embodiment of the invention, FIG. 4 illustrates the preferred embodiment of FIG. 3, seen in the direction B—B, FIG. 5 is a side-view illustration of a third preferred embodiment of the invention, and FIG. 6 illustrates the preferred embodiment of FIG. 5, seen in the direction C—C.

According to FIGS. 1 and 2, the filter cake 2, placed on the fine porous liquid suction surface constituting the filter surface, is made of the slurry 4 consisting of solids and liquids and contained in the slurry tank 3. The supporting structure 5 of the filter medium 1 is installed so that by means of the supporting structure 5, the filter cake 2 formed on the surface of the filter medium 1 is movable with respect to the oscillator 6. To said oscillator 6, there is connected a structural element 7 that can be made to oscillate by virtue of the oscillator 6, said structural element 7 being placed, in relation to the supporting structure 5 of the filtering device, so that while moving the supporting structure 5, in between that surface 8 of the filter cake 2 that is opposite to the filter medium 1, and that surface 9 of the structural element 7 that constitutes an outer surface 9 in relation to the oscillator 6, there is created a mechanical contact, when the filter cake 2 is being moved past the structural element 7. When the filter cake 2 is moved past the structural element 7, the structural element 7 is made to oscillate, and in between the filter cake 2 and the structural element 7, there is generated an acoustic field in order to reduce the residual moisture left in the filter cake 2.

In the embodiment according to FIGS. 3 and 4, the filter cake 12 located on the fine porous liquid suction surface constituting the filter surface of the filter medium 11 is made of slurry 14 consisting of solids and liquid and contained in a slurry tank 13. The filter cake 12 is made to oscillate by virtue of an oscillatable structural element 16 connected to the oscillator 15, so that said structural element 16 is moved towards the surface 17 of the filter cake 12 opposite to the filter medium 11, until that surface 18 of the structural element 16 that is placed opposite to the oscillator 15, and the surface 17 of the filter cake are in a mechanical contact with each other. As the mechanical contact is made between the surfaces 17 and 18, the structural element 16 is made to oscillate by virtue of the oscillator 15, so that there is generated an acoustic field in between said surfaces 17 and 18, and the filter cake 12 also begins to oscillate. Owing to said oscillation, the residual moisture still left in the filter cake 12 can be reduced.

According to FIGS. 5 and 6, the filter cake 22 located on the fine porous liquid suction surface constituting the filter surface of the filter medium 21 is made of slurry 24 consisting of solids and liquid and contained in a slurry tank 23. The filter cake 22 is made to oscillate by virtue of an oscillatable structural element 26 connected to the oscillator 25, so that said structural element 26 is moved towards the surface 27 of the filter cake 22 opposite to the filter medium 21, until that surface 28 of the structural element 26 that is placed opposite to the oscillator 25, and the surface 27 of the filter cake are in a mechanical contact with each other. As the mechanical contact is made between the surfaces 27 and 28, the structural element 26 is made to oscillate by virtue of the oscillator 25, so that there is generated an acoustic field as the structural element 26 is moved along the surface 27. When the structural element 26 has passed over the whole surface 28 of the filter cake, the oscillation of the structural element 26 is stopped, in which case the acoustic coupling between the surfaces 27 and 28 also disappears.

What is claimed is:

1. A method for making the drying of finely divided materials, more effective in a suction drier provided with a fine porous suction surface, where the radii of the fine pores of the suction surface are essentially within the range of 0.5–2 micrometers, and in which method, of a slurry containing liquid and solids there is made a filter cake (2,12,22) onto the fine porous liquid suction surface constituting the filter surface of a filter medium (1,11,21), characterized in that the filter cake (2,12,22) and an oscillator (6,15,25) are placed, in relation to each other, so that in between the filter cake (2,12,22) and the oscillator (6,15,25), there is generated an acoustic field by virtue of a mechanical contact between the filter cake (2,12,22) and the oscillator (6,15,25) or a structural element (7,16,26) connected to the oscillator.

2. A method according to claim 1, characterized in that the filter cake (2,12,22) is moved in relation to the oscillator (6,15,25).

3. A method according to claim 1, characterized in that the structural element (7,16,26) of the oscillator is moved in relation to the filter cake.

4. A method according to claim 1, characterized in that the filter cake (2,12,22) and the oscillator (6,15,25) are kept immovable with respect to each other while a mechanical contact exists between them.

5. A method according to any one of the preceding claims, characterized in that the oscillation frequency of the acoustic field is within the range 20–60 kHz.

6. A method according to claim 5, characterized in that the employed oscillator (6,15,25) is an ultrasonic oscillator.

7. A method according to claim 5, characterized in that the employed oscillator (6,15,25) is a piezoelectric material.

8. A method according to claim 5, characterized in that the employed oscillator (6,15,25) is a magnetostrictive material.

* * * * *